United States Patent [19]

Hurlbut et al.

[11] Patent Number: 5,182,746
[45] Date of Patent: Jan. 26, 1993

[54] TRANSCEIVER INTERFACE

[75] Inventors: Amy O. Hurlbut, San Francisco; Glen M. Riley, Los Gatos; Rod G. Sinks, Cupertino, all of Calif.

[73] Assignee: Intel Corporation, Santa Clara, Calif.

[21] Appl. No.: 676,948

[22] Filed: Mar. 28, 1991

[51] Int. Cl.[5] .................................. H04J 3/06
[52] U.S. Cl. ........................... 370/100.1; 370/85.1; 370/85.3; 370/105.1; 375/106
[58] Field of Search .............. 370/85.1, 85.3, 100.1, 370/105.1; 375/7, 106; 307/269, 480; 455/58.2; 340/825.5

[56] References Cited

U.S. PATENT DOCUMENTS 4,888,764 12/1989 Haug ............................ 370/85.1
4,918,690 4/1990 Markkula et al. ............. 370/94.1
4,939,728 7/1990 Markkula, Jr. et al. ........ 370/94.3

Primary Examiner—Douglas W. Olms
Assistant Examiner—Russell W. Blum
Attorney, Agent, or Firm—Blakely, Sokoloff, Taylor & Zafman

[57] ABSTRACT

An interface between a network cell and an associated network communications transceiver passes both network information and command/control information between the cell and the transceiver. The interface is designed to minimize the number of control lines between the cell and the transceiver. A protocol between the two devices is established to deal with configuration and error reporting as well as the passage of network data. This protocol consists of the cell and the transceiver each exchanging 8 bits of status and 8 bits of data simultaneously and continuously at rates up to 1.25 MBPS. Only a single version of cell firmware is required since a fixed amount of configuration information is sent from the cell to the transceiver, and a fixed amount of status information is returned from the transceiver to the cell.

16 Claims, 5 Drawing Sheets

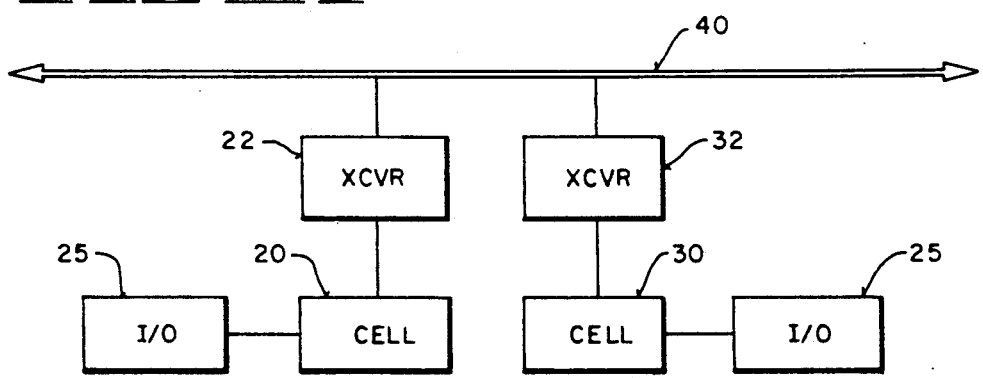
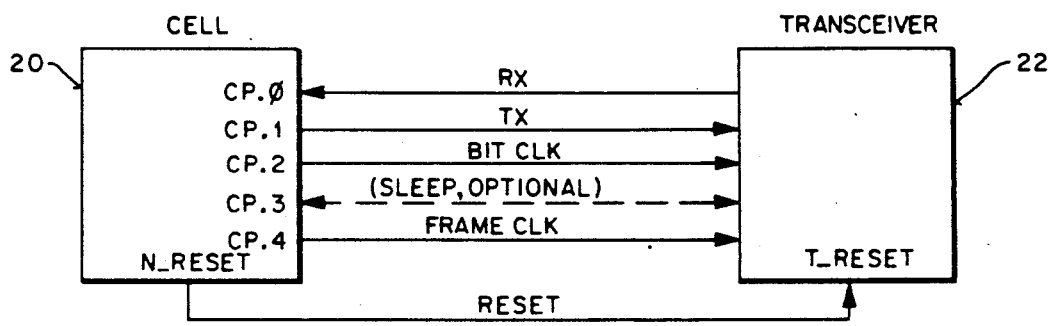
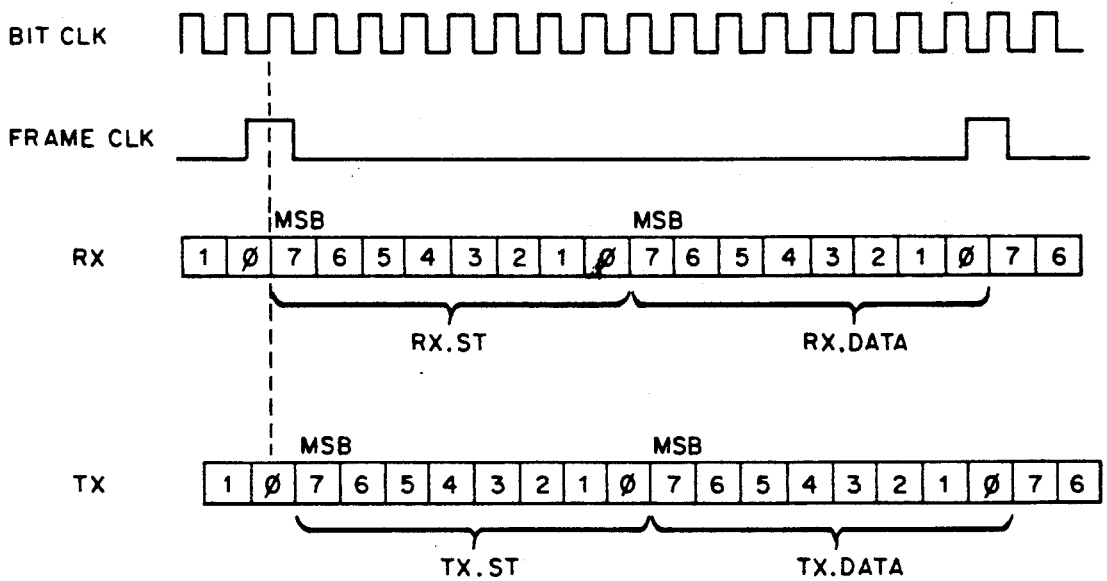

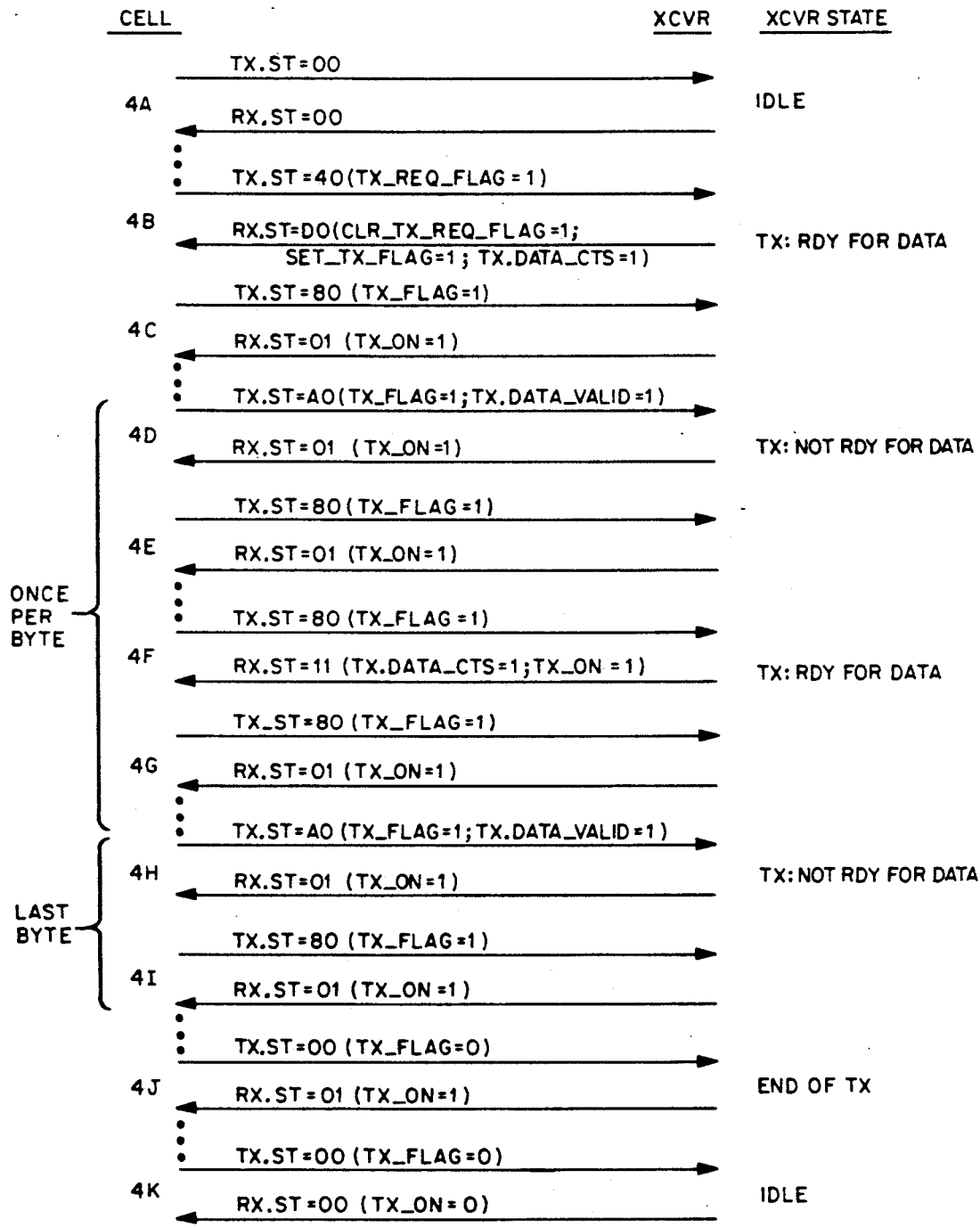

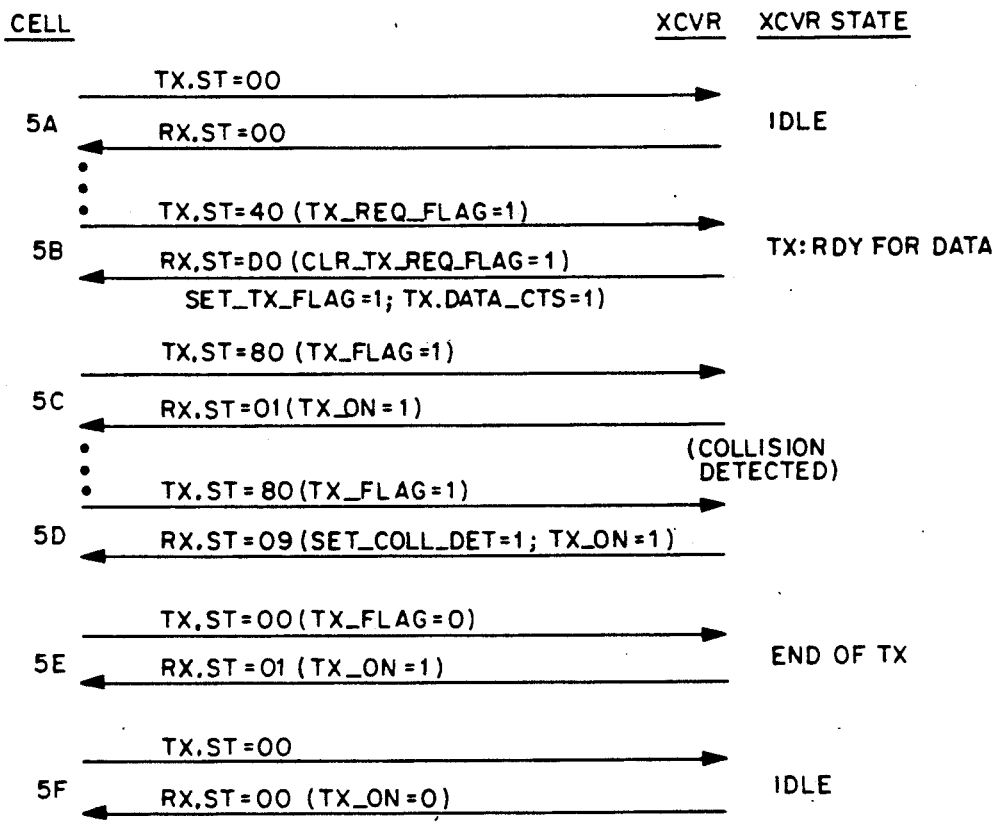
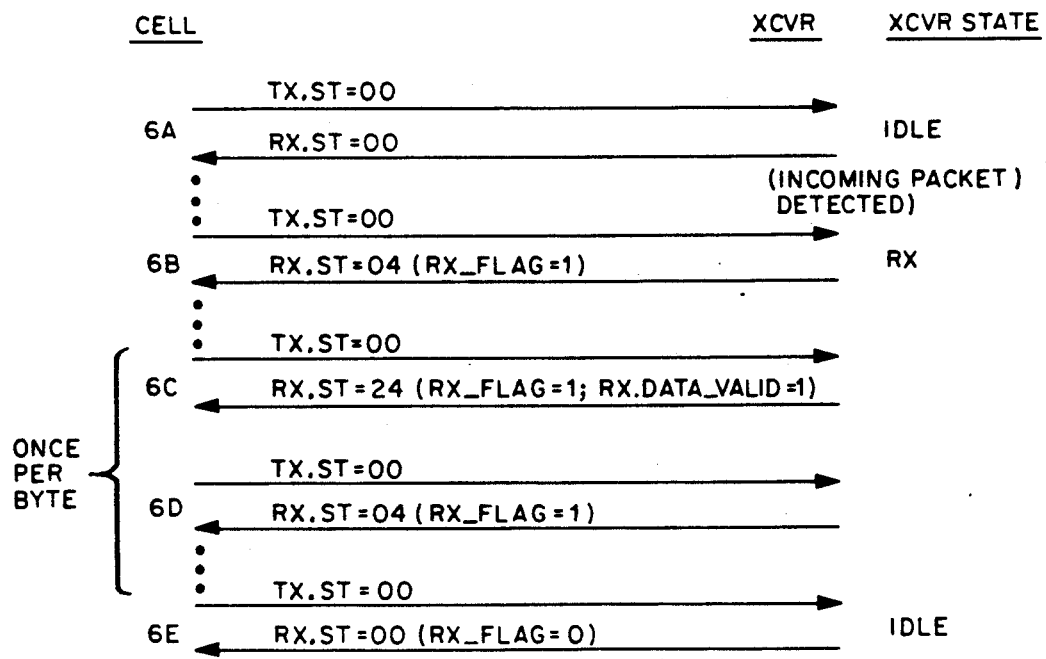

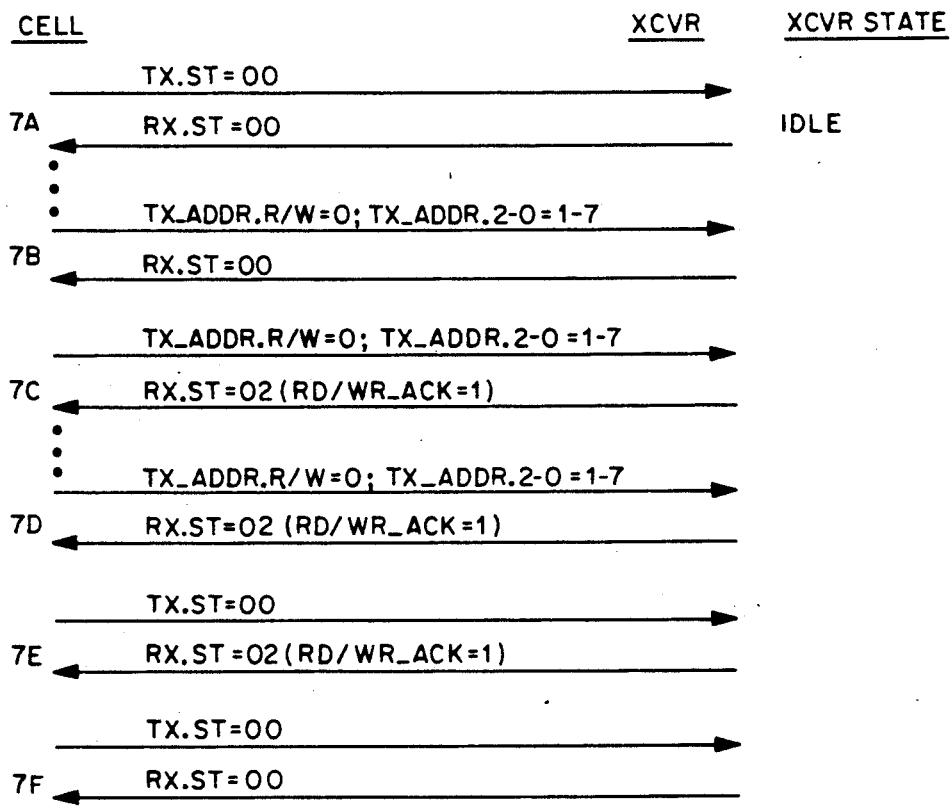
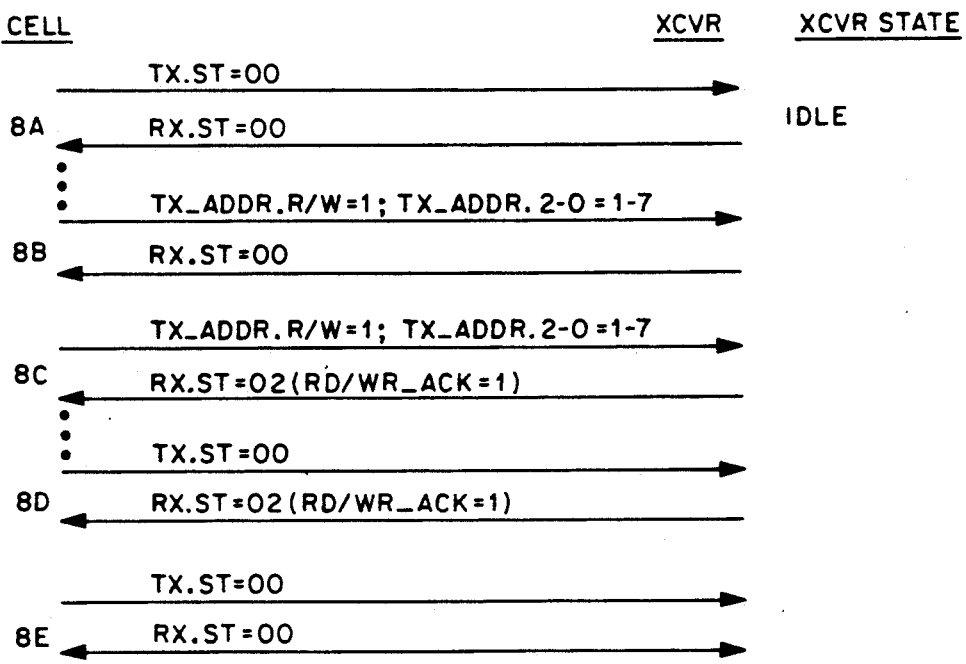

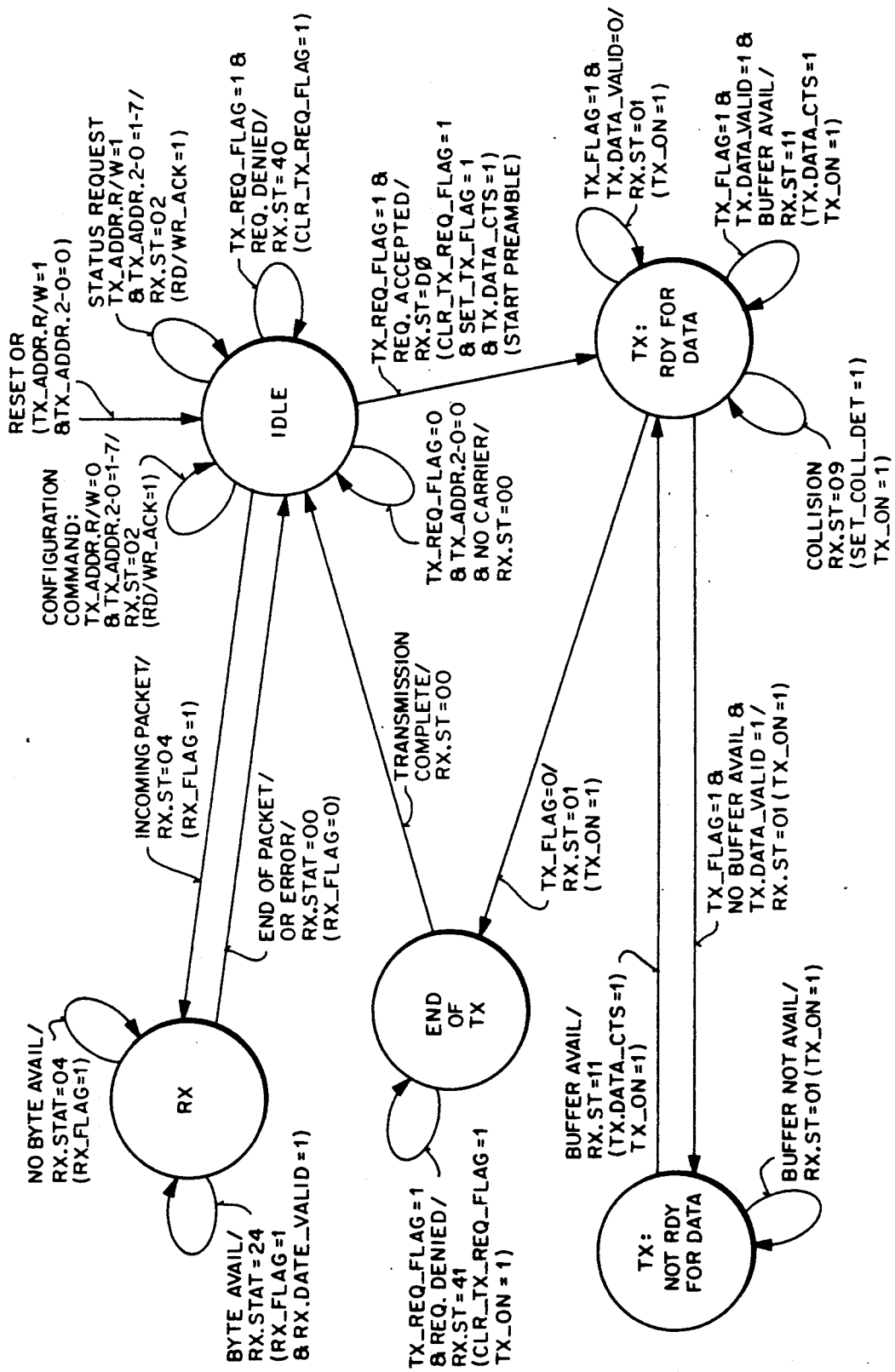

TRANSCEIVER INTERFACE

FIELD OF THE INVENTION

The present invention relates to the field of digital communications interfaces. More particularly, the invention relates to a dedicated status and data interface between a processor for a node on a communications network and a transceiver coupled to the network communication medium.

BACKGROUND OF THE INVENTION

U.S. Pat. No. 4,918,690 discloses a network for providing sensing, communications, and control. The disclosure of this patent is incorporated herein by reference. By way of brief summary, the network comprises a plurality of intelligent cells, each of which comprises an integrated circuit having a processor and input/output section. Each of the programmable cells receives a unique identification number which remains permanently within the cell. The cells can be coupled to any one of a variety of media such as power line, twisted pair, radio frequency, infrared, ultrasonic, optical, coaxial, etc. to form the network. Cells communicate with one another on the network by exchanging packets of data.

Each network may comprise groups of cells that perform particular functions. Cells can perform multiple functions and be members of multiple groups. The network protocol provides great flexibility and allows groups to be formed and/or changed after the cells are in place. The intelligence of the network is distributed among the cells. In general, the network is lightly loaded, although provisions may be made for contentions and other overload conditions that may arise. Communications between the cells in general is optimized for carrying out the functions assigned to the groups, rather than for transmission of data unrelated to the control function of the network. For this reason, communication packets are relatively short compared to more conventional local area networks.

A portion of a network of cells is illustrated in FIG. 1. Here, cells 20 and 30 are coupled to a communications medium 40 by means of respective transceivers 22 and 32. Additionally, each cell may be coupled to one or more of a variety of input/output devices 25, such as sensors and actuators, that interface with the environment and enable the cell to perform its assigned function in the network. For the purpose of the description to follow, the term "cell" will refer to the intelligent device coupled to the network, whereas a cell and its associated peripheral devices, including a transceiver and any input/output devices, will be referred to as a node.

As an example of a typical network application, cell 20 may be associated with a lighting fixture in a home, and cell 30 may be associated with a light switch. In this application, medium 40 may be the house wiring, although it could also be any of the other media recited above. Cell 30 would be assigned the function of sensing the opening or closing of its associated switch, while cell 20 would be assigned the function of controlling the flow of power to its associated light fixture in accordance with command and control information received over the network from cell 30 and from any other nodes that are functionally related, such as, for example, a node that senses ambient light levels.

Commercial embodiments of a device that may be employed as cells 20,30 are the integrated circuits sold under the trademark "NEURON" by both Motorola and Toshiba. These devices are manufactured under license from Echelon Systems Corp., the assignee of this invention and owner of the aforementioned U.S. Pat. No. 4,918,690. Briefly stated, a "NEURON" cell is a large scale integrated circuit device including a three-processor CPU, internal memory, communications port, I/O section and timing and control section. The three independent processors share a common memory, arithmetic logic unit (ALU) and control circuitry. Two of the processors are dedicated to communications and the third is dedicated to execution of application code.

Transceivers 22,32 are specifically designed for the particular network medium 40. Moreover, the transceivers may be simple line drivers in the case of a hard-wired network medium or may be more sophisticated devices. Characteristics of a more sophisticated transceiver may include:
  Multiple channel operation.
  Multiple speed
  Use of forward error correction.
  Media specific modulation techniques requiring special message headers and framing.
  Programmable and configurable operation.
  Ability to gather parametric data regarding transmission quality, noise, and received signal strength.
  Ability to shut down to save power during idle time.

SUMMARY OF THE INVENTION

The present invention provides an interface between a network cell and an associated network communications transceiver. The interface of the present invention is designed to minimize the number of control lines between the cell and the transceiver. The cell/transceiver interface is designed to pass both network information as well as command/control information between the cell and the associated transceiver. The present invention minimizes the number of pins on each chip to achieve these functions, which has the beneficial effect of reducing the cost associated with the manufacture and testing of the IC's.

A protocol between the two devices is established to deal with configuration and error reporting as well as the passage of network data. This protocol consists of the cell and the transceiver each exchanging 8 bits of status and 8 bits of data simultaneously and continuously at rates up to 1.25 MBPS. The high data rate allows time critical flags such as carrier detect to be exchanged across the interface with network data rates up to 100 KBPS.

Because it is desirable that the cell's communication firmware be the same in all cell-based devices, the interface is general enough to support a variety of transceiver designs with a single version of cell firmware. This is accomplished by writing a fixed amount of configuration information from the cell to the transceiver, and by reading a fixed amount of status information from the transceiver to the cell. All cell chips have some amount of EEPROM on them which is programmed prior to the time that the cell is integrated into a node with the configuration information necessary to initialize the associated transceiver. Upon receipt of a network management message, the cell's firmware can read the status registers within the transceiver and report their contents to a requesting device for network debugging and analysis. The cell's firmware need not be able to interpret what the status information indicates since it may be assumed that the application program requesting the status information is able to understand it.

Items that are to be defined by a specific transceiver include:
Definition of the registers that the cell may read and write.
Definition of preamble.
Use of watch dog timers on the transceiver (e.g., such that the node does not fail in a way that ties up the network indefinitely).
Use of transceiver run/sleep modes.

BRIEF DESCRIPTION OF THE DRAWINGS

FIG. 1 illustrates a network in which the present invention may be employed.

FIG. 2 illustrates the physical interface between a cell and its associated transceiver.

FIG. 3 illustrates the timing relationships between the cell/transceiver interface signals.

FIG. 4 illustrates the transmit sequences of the present invention.

FIG. 5 illustrates the transmit sequences of the present invention when collision detection is implemented in the transceiver.

FIG. 6 illustrates the receive sequences of the present invention.

FIG. 7 illustrates the configuration sequences of the present invention.

FIG. 8 illustrates the status request sequences of the present invention.

FIG. 9 is a transceiver state diagram.

DETAILED DESCRIPTION OF THE INVENTION

In the following description, for purposes of explanation and not limitation, specific details are set forth, such as numbers, protocols, circuit implementations, etc. in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention with unnecessary detail.

Physical Interface

The physical interface between an exemplary cell 20 and an associated transceiver 22 is depicted in FIG. 2. When the cell is configured to operate in transceiver mode, the cell and transceiver exchange status and data over a synchronous serial bus coupled to the cell's comm port comprising pins CP.0, CP.1, CP.2 and CP.4 of the cell. The fifth I/O pin, CP.3, of the cell's comm port is defined as "sleep". As indicated above, support of this pin's function is optional on the transceiver.

When CP.3 is connected to a transceiver with sleep capability, the cell can be configured to operate in one of two ways. The cell can be configured so that any incoming message will wake it up, in which case CP.3 is an input to the cell. Alternatively, the cell can be configured so that CP.3 is an output to the transceiver. An application program running on the cell can decide to sleep periodically and assert the pin. This will cause the transceiver to power down whenever the cell's application program instructs the cell to go to sleep. When the sleep pin is high the transceiver is to be awake; when the pin is asserted low, it is assumed that the transceiver is asleep.

The transceiver also has an input (T_Reset) which is tied to the cell's external reset pin (N_Reset). As more fully described below, the transceiver resets its state and internal registers when the external cell reset is asserted. The transceiver must not cause the cell to be reset by asserting this line.

CP.0 (RX) is the serial link from the transceiver to the cell. Each frame period, eight bits of status and eight bits of data are sent from the transceiver to the cell.

CP.1 (TX) is the serial link from the cell to the transceiver. Each frame period eight bits of status and eight bits of data are sent from the cell to the transceiver.

CP.2 (BIT CLK) is a bit clock generated by the cell which clocks data and status in and out of the cell and transceiver. The rate of the bit clock is the same as that of the Comm Port Clock on the cell. It should be noted that the Comm Port Clock rate is related to the cell input clock rate; the relation is configurable to be ÷8, 16, 32, 64, 128, 256, 512, or 1024. The maximum input clock rate of 10 MHz gives a maximum Comm Clock Rate of 1.25 MHz.

CP.4 (FRAME CLK) is a frame clock generated by the cell which pulses high for one bit time every 16 bit times on the serial link. The frame clock establishes a period of 16 bits during which eight bits of status and eight bits of data are exchanged.

The timing relationships of the above-described signals are illustrated in FIG. 3.

Status Bits

The eight-bit status field sent from the cell to the transceiver on CP.1 (TX) is denoted TX.ST. The eight-bit status field sent from the transceiver to the cell on CP.0 (RX) is denoted RX.ST. The individual bits in each of the status fields are named as follows:

| TX.ST | | RX.ST | |
|---|---|---|---|
| bit 7 | TX_FLAG | bit 7 | SET_TX_FLAG |
| bit 6 | TX_REQ_FLAG | bit 6 | CLR_TX_REQ_FLAG |
| bit 5 | TX.DATA_VALID | bit 5 | RX.DATA_VALID |
| bit 4 | Not assigned | bit 4 | TX.DATA_CTS |
| bit 3 | TX_ADDR.R/W | bit 3 | SET_COLL_DET |
| bit 2 | TX_ADDR.2 | bit 2 | RX_FLAG |
| bit 1 | TX_ADDR.1 | bit 1 | RD/WR_ACK |
| bit 0 | TX_ADDR.0 | bit 0 | TX_ON |

The functions of the status bits are described in connection with FIGS. 3-8 which diagrammatically illustrate the handshaking that occurs between the cell and transceiver for different scenarios. In the figures, each pair of arrows represents the exchange of status fields during one frame. The status field from the cell to the transceiver, TX.ST, is on the upper arrow of each pair; the status field from the transceiver to the cell, RX.ST, is on the lower arrow. The values of the status fields are indicated in hexadecimal, with the key bit values in parentheses. The transceiver state for each sequence is indicated to the right of the diagrams. In each scenario, the transceiver begins and ends in the "IDLE" state.

Transmit Sequences

FIG. 4 diagrammatically illustrates the transmit sequences. As indicated above, the transceiver begins in the "IDLE" state as shown in sequence 4A. Both the cell and the transceiver fill all status fields with zeros. In order for the cell to request to transmit on the network, the cell sets an internal latch whose output is TX_REQ_FLAG (TX.ST.6) as shown in sequence 4B. This latch within the cell is cleared by the transceiver via CLR_TX_REQ_FLAG (RX.ST.6), which is asserted by the transceiver for a single frame only. In the same frame that CLR_TX_REQ_FLAG is asserted, the transceiver either accepts or rejects the cell's request for transmission. The transceiver accepts the request by asserting SET_TX_FLAG (RX.ST.7) for a single frame only as also shown in sequence 4B. The transceiver rejects the request by not asserting SET_TX_FLAG in the frame.

The transceiver looks for carrier on the network right up until it either accepts or rejects the request for transmission. With each transceiver checking to ensure the network is idle immediately before accepting the transmit request and beginning to transmit, the occurrence of collisions on the network is minimized and thus network performance is improved. If the transceiver detects carrier on the network, it rejects the request by setting CLR_TX_REQ_FLAG for one frame and not asserting SET_TX_FLAG in the same frame. (The transceiver's further response to detection of carrier is described below under "Receive Sequences".) If the transceiver sees no carrier on the network, it accepts the request by setting CLR_TX_REQ_FLAG and SET_TX_FLAG for one frame and immediately begins transmitting preamble on the network, as described below. Assertion of SET_TX_FLAG for one frame causes a latch within the cell whose output is TX_FLAG (TX.ST.7) to be set. This latch will later be cleared internally by the cell to end transmission.

When the transceiver accepts the request for transmission as just described, the transceiver must assert TX.DATA_CTS (RX.ST.4) for a single frame only before the cell sends the first byte of data. TX.DATA_CTS may be set in the same frame as CLR_TX_REQ_FLAG and SET_TX_FLAG, i.e., RX.ST=D0 as shown in sequence 4B.

When the transceiver has accepted the request for transmission, it begins to send its preamble on the network. The content of the preamble is defined by the transceiver in accordance with the communications protocol for the network. The transceiver may impose a minimum requirement on the duration of the preamble, but the preamble must either be extended until the first byte of data to be transmitted is available from the cell, or be guaranteed to be long enough such that the first byte of data is available before the end of the preamble in accordance with the communications protocol for the network. In this way the transmitting cell determines the minimum length of time a receiving node will have between notification of an incoming packet and when it must be ready to receive the data bytes of the incoming packet. On reception, the node's transceiver strips off the preamble and returns only valid data bytes to the cell.

If the transceiver has previously asserted TX.DATA_CTS for a single frame, the transceiver has indicated that it is in the "TX:rdy for data" state and the cell may send a byte of data. Until such time as the cell transmits the first byte, the TX_FLAG is maintained high and the transceiver maintains TX_ON high (as described below) (sequence 4C). To send a byte of data, the cell shifts eight bits out in the field TX.DATA.7-0. (Bit 7 is the MSB and is shifted out first.) In the same frame as the data is shifted out, the cell asserts TX.DATA_VALID for a single frame only (sequence 4D). Observe in FIG. 3 that the status field TX.ST precedes TX.DATA in each frame, and therefore TX.DATA_VALID is asserted before TX.DATA is shifted out. If the transceiver sets TX.DATA_CTS in the same frame as SET_TX_FLAG and CLR_TX_REQ_FLAG, the cell may set TX.DATA_VALID in the first frame in which TX_FLAG is set, i.e., sequence 4D may follow immediately after sequence 4B.

The cell may not send another byte of data to the transceiver until the transceiver indicates it is ready to accept the next byte by again asserting TX.DATA_CTS for a single frame only (sequence 4F). In the interim, the cell maintains the TX_FLAG set and the transceiver maintains TX_ON set (sequences 4E,4G). If the transceiver is not ready to receive another byte, it enters the state "TX: not rdy for data". When ready for another byte from the cell, the transceiver asserts TX.DATA_CTS for a single frame and returns to the state "TX: rdy for data" (sequence 4F).

Sequences 4D-4G repeat for each byte of data sent by the cell, except that upon transmission of the last byte, the cell does not look for the transceiver to assert TX.DATA_CTS (sequences 4H,4I). After the cell has sent the last byte of data, it clears the latch whose output is TX_FLAG to indicate end of transmission (sequence 4J). In response to TX_FLAG=0, the transceiver goes to "END OF TX" state, but continues transmitting on the network until all bytes from the cell are transmitted. After the transceiver has completed transmitting the packet on the network, it goes to "IDLE" state (sequence 4K). At any time, if the cell wants to abort transmission, it clears TX_FLAG. The transceiver transmits the last byte(s) of data and then stops transmitting.

TX_FLAG must be cleared by the cell at least one frame following the last assertion of TX.DATA_VALID. The cell may cause an extra TX.DATA_VALID to be asserted after TX_FLAG has been reset. This TX.DATA_VALID, asserted when TX_FLAG is low, must be ignored.

The cell must deliver bytes fast enough that the transceiver does not have an underflow condition. An underflow condition exists when the transceiver needs another byte of data to transmit or an indication to stop transmitting, but does not receive it in time. The maximum time between the assertion of TX.DATA_CTS by the transceiver and either the assertion of TX.DATA_VALID (another byte to transmit) or the de-assertion of TX_FLAG (end of transmission) by the cell must be specified by each transceiver. This time depends on the network data rate and the amount of buffering on the transceiver. In case of underflow, the transceiver sends all zeros. As mentioned above, the cell does not need TX.DATA_CTS to be asserted after sending the last byte of data before it may clear TX_FLAG. However, the maximum time until TX_FLAG is cleared must be specified relative to TX.DATA_CTS being asserted.

One of the status bits from the transceiver to the cell (RX.ST.0) is reserved for reporting the state of the transceiver's transmitter (1=on; 0=off). The cell's firmware watches this bit after it completes the transmission of a packet (after TX_FLAG is reset), and if the flag fails to clear, the transceiver will be reset by the cell in the hopes that this will turn the transmitter off. The reset will occur as the result of a watchdog timer reset on the cell.

Referring now to FIG. 5, transmit sequences for a transceiver that implements collision detection are illustrated. Transmission proceeds in ordinary fashion until a collision is detected and thus sequences 5A-5C are identical to sequences 4A-4C. If the transceiver detects a collision while transmitting its preamble, it asserts SET_COLL_DET (RX.ST.3) for one frame (sequence 5D). SET_COLL_DET clears the latch on the cell whose output is TX_FLAG, thus aborting transmission at sequence 5E. SET_COLL_DET also sets a latch on the cell which indicates to the CPU that there was a collision. If the transceiver does not support collision detection, the bit SET_COLL_DET must always remain low.

Receive Sequences

Receive sequences are illustrated in FIG. 6. When the transceiver detects carrier on the line, it attempts to establish with a high level of certainty that the carrier detect indication is indeed an incoming packet and not a false carrier detect indication. When the transceiver establishes that there is an incoming packet, it sets an internal latch whose output is RX_FLAG (RX.ST.2) as shown in sequence 6B and enters the "RX" state.

It should be noted that the transceiver makes two separate determinations: one for "carrier detect" and one for "incoming packet". As described in "Transmit Sequences" above, in order to avoid collisions, the carrier detect indication causes the transceiver to reject a concurrent request for transmission. However, in order not to falsely indicate to the cell that a packet is incoming, the transceiver processes the signal for some duration to establish with a high level of certainty that there is an incoming packet. This may involve processing carrier sync, bit sync, or word sync, in accordance with the network communications protocol.

After setting RX_FLAG, the transceiver begins to receive data from the network. When the transceiver receives the first byte of data from the network, it shifts eight bits out in the field RX.DATA.7-0. (Bit 7 is the MSB and is shifted out first.) In the same frame, the transceiver asserts RX.DATA_VALID (RX.ST.5) for one frame only (sequence 6C). Since the status field RX.ST precedes RX.DATA in each frame, RX.DATA_VALID is asserted before RX.DATA is shifted out. RX_FLAG must be set at least one frame before the first RX.DATA_VALID is asserted.

Sequences 6C and 6D are repeated for each subsequent byte. The transceiver maintains RX_FLAG high until the end of packet is detected and all bytes of data have been shifted to the cell.

There is no indication from the cell whether or not it is ready to receive another byte. To avoid a requirement that the transceiver have large amounts of buffering, the cell must be able to receive bytes from the transceiver as fast as the transceiver receives them from the network. The minimum time between consecutive bytes of received data, which is dependent on the network data rate, must be specified by each transceiver.

After the transceiver has delivered the final byte of data, it clears RX_FLAG (sequence 6E). The transceiver must not deliver trailing bits of invalid data to the cell. This implies that the transceiver must account for any delay in detecting the end of carrier and any padding with zeros for error coding not done on byte-size blocks. If the transceiver needs to abort the receive sequence for some reason (e.g., bit sync or word sync is lost), it simply clears clears RX_FLAG.

Configuration/Status Request Sequences

The cell's CPU is able to write to seven 8-bit registers in the transceiver and is able to read seven 8-bit registers in the transceiver. The definition of the contents of these registers is specific to each transceiver. However, every transceiver must have at least one configuration register containing at least one configuration bit. The required bit is bit 7 of the transceiver's configuration register 1. The function of this bit is described below.

TX status bit 3, TX_ADDR.R/W, indicates whether the cell is reading or writing a transceiver register. TX_ADDR.R/W=0 indicates a write; TX_ADDR.R/W=1 indicates a read. Status bits 2-0, TX_ADDR.2-0, designate one of seven possible registers, from 1-7 (bit 2 is the MSB). Register 0 is not defined, and a read or write command to register 0 is invalid. (As will be described below, a read command to register 0 will cause the transceiver to reset.)

The transceiver is required to accept and respond to configuration commands and status requests only when in the "IDLE" state, that is, when the transceiver is neither transmitting nor receiving.

Configuration

Configuration sequences are illustrated in FIG. 7. In order for the cell to write to a transceiver register (send configuration data to the transceiver), the cell CPU writes eight bits of register data which are shifted out in TX.DATA.7-0. (Bit 7 is the MSB and is shifted out first.) The cell CPU also sets TX_ADDR.R/W=0 (write) and designates the register to be written with TX_ADDR.2—0=1—7 (sequence 7B). These data indicate to the transceiver that the TX.DATA field of that same frame contains the configuration byte. The transceiver acknowledges that the configuration is complete by asserting RD/WR_ACK (RX.ST.1) for one frame (sequence 7C). When the cell writes a configuration register, the acknowledgement for the write must be in the next frame.

The write register command will be sent by the cell in consecutive frames at least until the transceiver acknowledges the command, and the command will be sent for an indeterminate number of frames after the response until the cell's CPU clears the latches. The transceiver acknowledges each write command by asserting RD/WR_ACK for one frame as indicated by sequence 7D. Once the cell deasserts the write register command (sequence 7E), the transceiver deasserts RD/WR_ACK for the next succeeding frame (sequence 7F).

The cell's firmware writes all of the possible configuration registers in descending order, from register 7 to register 1. If the transceiver implements fewer than the maximum number of 7 registers, exact address decoding for the unused registers is not required. The subset of the registers that are actually implemented on the transceiver will be the last ones written to, and thus contain the correct values.

The transceiver must provide a RD/WR_ACK for configuration of each of the seven registers, regardless of how many registers actually are implemented on the transceiver. The RD/WR_ACK from the transceiver is issued in the frame following the configuration command.

Bit 7 of configuration register 1 is always required. This configuration bit, referred to as ALT_PATH, indicates which of two possible transmission modes to use. These transmission modes are dependent on the transceiver design, and more than one mode need not be implemented by the transceiver designer. Examples of transmission modes are: two different modulation techniques, two different speeds, two different channels or carriers, or a combined speed and carrier frequency change. The cell's firmware will switch back and forth between these two alternatives prior to transmitting a packet under normal operation, so the modification of this configuration bit cannot disrupt the operation of the transceiver. The change over from ALT_PATH=1 to ALT_PATH=0 or from ALT_PATH=0 to ALT_PATH=1 must occur in 1 frame.

It is the transceiver designer's choice as to whether this capability of multi-channel or multi-speed is to be implemented, but if the transceiver does implement this feature, it is required that the transceiver be able to detect carrier on both paths simultaneously, and be able to receive a packet on either channel without any configuration action by the cell. For example, a transmitting node may decide to initiate a re-try message at a lower data rate. The transceivers of all other nodes must be able to detect such a slower data rate message on the channel and adapt their receivers to receive the packet without any configuration command from the cells attached to the transceivers which are receiving the slower packet. The same holds true if, instead of speed, the carrier frequency, modulation technique, etc. is changed by toggling the ALT_PATH configuration bit.

In no case is it required for the transceiver to be able to receive two simultaneous messages, one on each of the ALT_PATHs. The upper layers of the communications protocol should attempt to make it so that this condition occurs infrequently. When this condition occurs, it is treated as a collision, and it is acceptable that the transceiver receives either one or none of the colliding packets.

Whenever the ALT_PATH function is implemented in the transceiver, ALT_PATH=1 is understood by the cell firmware to be the more reliable and is used as the "last resort" to get a packet through the network.

Status

Status request sequences are illustrated in FIG. 8. In order for the cell to read a transceiver register (request status data), the cell's CPU sets TX_ADDR.R/W=1 (read), and designates the register to be read with TX_ADDR.2—0=1—7 (sequence 8B). The transceiver returns the status byte by shifting out the byte in the field RX.DATA.7-0. (Bit 7 is the MSB and is shifted out first.) The transceiver asserts RD/WR_ACK (sequence 8C) to indicate that the designated register contents are available in RX.DATA.7-0 of the same frame. When the cell requests the contents of a status register, the byte of status information must be in the next frame after the request. The acknowledgement for the request must be in the same frame as the status register contents.

The read register command will be sent in consecutive frames at least until the transceiver acknowledges the command and returns the status byte, and the command will be sent for an indeterminate number of frames after the response until the cell CPU clears the latches. The transceiver responds to each read command by returning the data and asserting RD/WR_ACK for one frame. Once the cell deasserts the read register command (sequence 8D), the transceiver deasserts RD/WR_ACK for the next succeeding frame (sequence 8E).

The transceiver must provide a RD/WR_ACK for a status request of any register, 1 through 7, regardless of the actual number of status registers implemented on the transceiver. The status registers are read as a result of the node receiving a network management command to do so. It may be assumed that the node issuing the network management command knows which registers are implemented, and what the status registers mean. The RD/WR_ACK is issued in the frame following the status request command, such that the status byte is in the same frame as the first RD/WR_ACK.

Reset

The cell's external reset signal causes the transceiver to reset its state and internal registers. The transceiver is no longer configured after the external reset signal causes a "hard" reset. Upon hard reset of the transceiver, all configuration information is lost. The cell firmware will then download the configuration registers on the transceiver in descending order. During this time, that is, until configuration register 1 is written, the transceiver must not attempt to send any incoming packets to the cell.

The cell may command a "soft" reset by issuing a read status request for register 0 (TX_ADDR.R/W=1 and TX_ADDR.2—0=0). If the transceiver is in any state but "IDLE" at the time of such a soft reset, the transceiver aborts whatever it is doing and returns to the "IDLE" state. This soft reset does not cause the transceiver to reset its internal registers. Specifically, the transceiver remains configured after the soft reset command.

FIG. 8 shows a state diagram for the transceiver. For each state transition, the input which causes the transition and/or resultant output is identified, together with the resultant output, if any. The input may either be bits of the TX.ST field from the cell, network status, or internal transceiver conditions. The resultant output is the RX.ST field to the cell.

Timing

The System Clock rate and the Comm Clock rate on the cell must be chosen to ensure proper handshaking; the minimum required clock rates depend on network transmission rate. Timing constraints which are critical to operation of the interface and govern the minimum clock rates are described below:

1) To prevent a transmit underflow condition on the transceiver, the transceiver must specify the maximum delay in the cell's response to TX.DATA_CTS from the transceiver. The cell's response may be either TX.DATA_VALID=1 (another byte to transmit) or TX_FLAG=0 (end of transmission).

2) To prevent receive overrun on cell, the transceiver must specify the minimum time between consecutive assertions of RX.DATA_VALID from the transceiver, and the cell must be able to receive at that rate.

3) All transceivers must be capable of running with the maximum Comm Clock rate of 1.25 MBPS of the cell.

We claim:

1. In a network node having an intelligent cell and a transceiver, the transceiver coupled to a communications medium for communicating with other nodes of the network, a method for exchanging information between the cell and the transceiver and transmitting information on the communications medium comprising the steps of:

(a) supplying the transceiver with a bit clock generated by the cell;
(b) supplying the transceiver with a frame clock generated by the cell;
(c) transferring successive frames of transceiver-bound information from the cell to the transceiver during respective successive cycles of the frame clock;
(d) transferring successive frame of cell-bound information from the transceiver to the cell substantially concurrently with the transfer of corresponding frames of transceiver-bound information, wherein each frame of said transceiver-bound and cell-bound information both comprise a plurality of status bits and a plurality of data bits transferred in synchronism with the bit clock;
(e) transmitting the field of data bits of at least one frame of transceiver-bound information on the communications medium.

2. The method of claim 1 further comprising the steps of detecting a collision on the communication medium and advising the cell of such collision by setting a status bit in the cell-bound information.

3. The method of claim 1 wherein a first frame of transceiver-bound information includes configuration data and further comprising the step of selecting one of a plurality of transceiver transmission modes in response to the configuration data.

4. The method of claim 1 wherein a first frame of transceiver-bound information includes configuration data and further comprising the step of selecting one of a plurality of different data rates in response to the configuration data.

5. The method of claim 1 wherein a first frame of transceiver-bound information includes configuration data and further comprising the step of selecting one of a plurality of different communications channels in response to the configuration data.

6. The method of claim 1 wherein a first frame of transceiver-bound information includes configuration data and further comprising the step of selecting one of a plurality of different transmission frequencies in response to the configuration data.

7. The method of claim 1 wherein a first frame of transceiver-bound information includes configuration data and further comprising the step of selecting one of a plurality of different modulation techniques in response to the configuration data.

8. The method of claim 1 further comprising the steps of listening for carrier on the communications medium and processing a detected carrier signal for a predetermined period of time to verify presence of the incoming packet.

9. In a network node having an intelligent cell and a transceiver, the transceiver coupled to a communications medium for communicating with other nodes of the network, a method for exchanging information between the cell and the transceiver and comprising the steps of:

(a) supplying the transceiver with a bit clock generated by the cell;
(b) supplying the transceiver with a frame clock generated by the cell;
(c) transferring successive frame of transceiver-bound information from the cell to the transceiver during respective successive cycles of the frame clock;
(d) transferring successive frames of cell-bound information from the transceiver to the cell substantially concurrently with the transfer of corresponding frame of transceiver-bound information, wherein each frame of said transceiver-bound and cell-bound information both comprise a plurality of status bits and a plurality of data bits transferred in synchronism with the bit clock; and wherein a first frame of transceiver-bound information includes a transmit request flag for requesting the transceiver to transmit on the communications medium and a first frame of cell-bound information includes a first status bit to clear the transmit request flag; and
(e) listening for carrier on the communications medium before the transceiver responds to said request.

10. The method of claim 9 wherein, if the transceiver does not detect carrier on the communications medium, the transceiver accepts said request and the cell-bound information of the first frame further comprises a second status bit to set a transmit flag.

11. The method of claim 9 wherein, if the transceiver detects carrier on the communications medium, the transceiver rejects said request.

12. In a network node having an intelligent cell and a transceiver, the transceiver coupled to a communications medium for communicating with other nodes of the network, a method for exchanging information between the cell and the transceiver comprising the steps of:

(a) supplying the transceiver with a bit clock generated by the cell;
(b) supplying the transceiver with a frame clock generated by the cell;
(c) transferring transceiver-bound information form the cell to the transceiver including a transceiver status request flag and a register address during a first frame of the frame clock;
(d) transferring cell-bound information from the transceiver to the cell including data contained in a transceiver register identified by the register address and a status acknowledgement flag during a second frame of the frame clock, wherein the second frame immediately follows the first frame.

13. In a network node having an intelligent cell and a transceiver, the transceiver coupled to a communications medium for communicating with other nodes of the network, an apparatus for exchanging information between the cell and the transceiver comprising:

first interconnection means for transferring first information from the cell to the transceiver;
second interconnection means for transferring second information from the transceiver to the cell substantially concurrent with the transfer of first information;
third interconnection means for supplying the transceiver with a bit clock generated by the cell;
fourth interconnection means for supplying the transceiver with a frame clock generated by the cell;
wherein said first and second information both comprise a plurality of data bits and eight status bits.

14. In a network node having an intelligent cell and a transceiver, the transceiver coupled to a communications medium for communicating with other nodes of the network, an apparatus for exchanging information between the cell and the transceiver comprising:

first interconnection means for transferring first information from the cell to the transceiver;
second interconnection means for transferring second information from the transceiver to the cell substantially concurrent with the transfer of first information;
third interconnection means for supplying the transceiver with a bit clock generated by the cell;
fourth interconnection means for supplying the transceiver with a frame clock generated by the cell;

wherein said first and second information both comprise a plurality of status bits and eight data bits.

15. The apparatus of claim 14 further comprising fifth interconnection means for asserting a wake-up signal at the cell when the transceiver receives a message from the network.

16. The apparatus of claim 14 further comprising fifth interconnection means for asserting a sleep signal at the transceiver when the cell powers down.

* * * * *

UNITED STATES PATENT AND TRADEMARK OFFICE
CERTIFICATE OF CORRECTION

PATENT NO. : 5,182,746

DATED : 1/26/93

INVENTOR(S) : Hurlbut et al.

It is certified that error appears in the above-identified patent and that said Letters Patent is hereby corrected as shown below:

Title Page:

[73] Assignee      delete "Intel Corporation, Santa Clara, Calif."

insert --Echelon Corporation, Palo Alto, Calif.-- col. 02, line 22      after "speed" insert --operation-- col. 07, line 68      delete "clear" (2nd occurrence)

Signed and Sealed this

Thirteenth Day of April, 1993

Attest:

STEPHEN G. KUNIN

*Attesting Officer*      *Acting Commissioner of Patents and Trademarks*